(No Model.) 5 Sheets—Sheet 1.

J. S. BADIA.
LIFE PRESERVER.

No. 335,173. Patented Feb. 2, 1886.

Witnesses
M. Gallagher
M. B. Farrell

Inventor
Joseph S. Badia
By Connolly Bros,
Attorneys.

(No Model.)　　　　　　J. S. BADIA.　　　　5 Sheets—Sheet 2.
LIFE PRESERVER.

No. 335,173.　　　　　　　　　　Patented Feb. 2, 1886.

Witnesses
M. Gallagher
M. B. Farrell

Inventor
Joseph S. Badia,
By Connolly Bros.

(No Model.)  J. S. BADIA.  5 Sheets—Sheet 4.
LIFE PRESERVER.

No. 335,173.  Patented Feb. 2, 1886.

Witnesses
M. Gallagher.
M. B. Farrell.

Inventor
Joseph S. Badia,
By Connolly Bros,
Attorneys.

(No Model.) 5 Sheets—Sheet 5.

J. S. BADIA.
LIFE PRESERVER.

No. 335,173. Patented Feb. 2, 1886.

UNITED STATES PATENT OFFICE.

JOSEPH S. BADIA, OF PHILADELPHIA, PENNSYLVANIA.

LIFE-PRESERVER.

SPECIFICATION forming part of Letters Patent No. 335,173, dated February 2, 1886.

Application filed September 3, 1884. Renewed August 3, 1885. Serial No. 173,448. (No model.)

*To all whom it may concern:*

Be it known that I, JOSEPH S. BADIA, a citizen of the United States, residing at Philadelphia, in the county of Philadelphia and State of Pennsylvania, have invented certain new and useful Improvements in Life-Preservers and Floats; and I do hereby declare the following to be a full, clear, and exact description of the invention, reference being had to the accompanying drawings, which form part of this specification.

Fig. 20$^a$ is a perspective of detail of capsule. Fig. 20$^b$ is a still further detail.

The object of my invention is to provide an apparatus containing material for the formation of gases and mechanism for automatically liberating the same and thereby filling or charging bags or other receptacles under or in contact with the water, and which, being applied to the body of a person or to a vessel or other object, will render the same buoyant or unsinkable.

A further object of my invention is to provide for the inflation of canvas boats or rafts sent to the rescue of wrecked crews or vessels in danger, and for the automatic propulsion of torpedoes and other marine or submarine vehicles.

My invention consists, first, in the provision of an apparatus the special and essential features of which are the materials and means for producing and automatically liberating suitable gases when the apparatus is submerged in water and for charging or filling bags, tanks, or other receptacles with said gases, so as to render the same buoyant and thereby serviceable and effective in saving life and property; secondly, in the specific construction, combination, and arrangement of devices and instrumentalities conducing toward the end and aim of my invention, as hereinafter described, and pointed out in the claims.

The apparatus constituting the most essential element of my invention consists of a capsule adapted for application to a bag, tank, or other receptacle for expanded gases, which is made an appurtenant part of a life-preserver or other device, or which is made capable of being applied or attached to or contained in a boat, raft, or other vessel or object contingently subject or liable to contact with or submersion in deep and dangerous waters. The capsule is designed to contain liquefied gases—such as ammonia, nitrous-oxide, carbonic-acid, or other suitable gas—in one compartment, while an adjoining compartment contains suitably-prepared powder or other combustible and a frictionally-ignitible preparation for lighting the same. Mechanism provided for automatically igniting the said preparation, and thereby effecting the combustion of the powder, is held in check by a strip of soluble paper or its equivalent, which is ruptured or disintegrated when moistened, and which then allows the gas-liberating and powder-igniting mechanism to act and the bag or other gas-receptacle to become charged.

The combustion of the powder is an expedient for both liberating the gases and for generating additional gas, and sufficient heat to prevent the freezing of the liquified gases upon release of pressure.

The following description in detail explains the construction and arrangement of the means for carrying my invention into effect.

Figure 17:
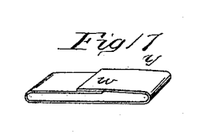
Figure 18:
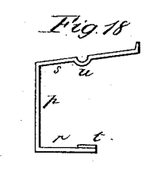
Figure 20A:
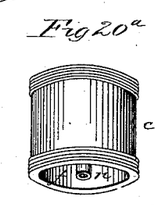
Figure 20B:
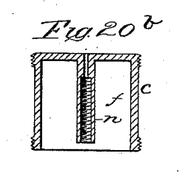

The apparatus embodying the main features of my invention consists of a capsule, $a$, of cylindrical or other form, provided with flat heads, and having a brim, $g$, in the top curved outwardly, and a surrounding flange, $h$, which serves to secure the capsule in place through the means of the cap $i$. The capsule $a$ is provided with projections $jj$ and $kk$ in the bottom, and two, $ll'$, in the top. Through the heads and in the middle of the capsule is a hole, $m$, with thread $b$, in which is fitted a cylinder, $c$, (see Fig. 20,) made flush at its ends with the heads of the capsule, and having one end open, as shown. When the cylinder is in place, an annular space, $e$, is left between it and the wall of the capsule, while the cavity of the cylinder constitutes another space or compartment, $f$. In the center of the cylinder $c$ is formed a boss, $n$, having a hole through it, (see Fig. 20$^a$,) in which is arranged a rod, $p$, having on either end an arm, $r$ and $s$, respectively. This rod is free to turn in the hole, but at the same time it is made water-tight and air-tight by means of a packing, $o$, made of a cylinder of soft wood screwed tightly in place, and formed with a central hole for the rod $p$, which hole is greased with hard tallow. At the extremity of the lower arm, $r$, of the rod $p$ is a flat surface, $t$, Fig. 18, on which is glued a small piece of sand-paper, and in the upper arm, $s$, there is a crook or bend, $u$, against which presses a raised spiral spring, $v$, hooked thereto, and designed to cause the arm $s$ to turn around when free to do so. The outer end of the spring $v$ is made fast to the projection $l'$ on the upper end or the head of capsule. The spring $v$ also exerts an upward pressure on the arm $s$ by reason of its being compressed downward to engage with the crook or bend of the arm, and this upward pressure is utilized for a purpose to be hereinafter explained. The pin or projection $l$ holds a rigid arm, $z$, between which and the arm $s$ is held a band or strip of unsized paper, $y$, free from oil or grease. This band of paper serves to hold the arm $s$ in check, and prevent it from being turned by the spring $v$, and should be of such a character and of such material that it will effectually serve its purpose so long as it remains dry. Ordinary blotting-paper will be found serviceable, and to increase its stiffness and restraining properties it may be treated to a coating of or saturated with starch-water. The ends of the band are overlapped and glued together at $w$, Fig. 17, or otherwise fastened. As will hereinafter appear, this band of paper plays a most important and delicate part in the action of the apparatus.

Figure 4:
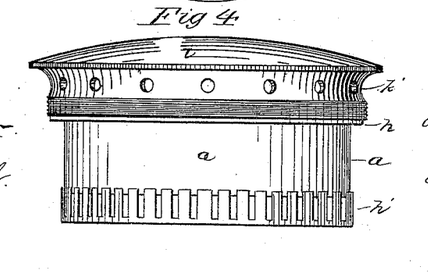
Fig. 4 is a side elevation of the capsule.

The projections $jj$ in the lower side of the capsule have small holes $b'b'$, communicating with the annular space $e$, and with the exterior of the same. When the capsule is not in active use, these holes are closed by means of springs $a'$, having their ends flattened and soldered around a thin disk, $f'$, with bismuth solder of a very low point of fusion, and forming a spider-like contrivance, as shown. To the outer ends of these springs are soldered pieces of lead, $d'd'$, which are pressed by the springs against the holes $b'$ of the projections $jj$, keeping said holes perfectly closed against the ordinary pressure within the annular space $e$. When necessary, these springs operate as safety-valves to relieve abnormal pressure, such operation being permitted by the peculiar elbow-shape of the springs. The projections $kk$ serve the purpose of holding, by means of small screws, a protecting-cover, $h'$. This cover has a brim with fine slits all around, as shown at Fig. 4, for the easy exit of the gases.

The cap $i$, as shown, is formed with a peripheral groove pierced with small holes $k'$. The top of the cap is slightly ovaliform, and has a milled edge to aid in its manipulation. The lower portion of its depending flange is externally threaded to secure its fitting the ring at the mouth of the gas-bag. T represents said ring formed with an L-shaped internally-threaded flange, $t$, to which the cap is screwed. Said flange is also externally threaded, as shown at $t'$, for the attachment of another ring, T'. The bag M is fastened between the two rings, as shown. The capsule is flanged at $h$, the cap resting against or upon said flange. Between said flange and the horizontal portion of the ring-flange $t$ is placed a rubber ring, $m'$, which renders the joint at that point air and water tight.

To reach the paper-band $y$, the water entering the holes $k'$ has to pass upward and over the curved brim. The object of said brim is to prevent the band from being moistened should any drops of water enter the holes $k'$ at any time when it is not desired to have the apparatus operate. In such cases the water passing in through some of the holes $k'$ passes around the curved brim and escapes through other holes $k'$, and does not touch the paper band, which is only affected when the water enters bodily, as when the capsule is submerged, and therefore in a condition to be operated.

The space $e$ is to be supplied with gas, liquefied by pressure—such as ammonia, nitrous-oxide, carbonic-acid, or other suitable gas—a certain space being left unfilled, so as to allow the gas room to expand under changes of temperature.

Figure 1:
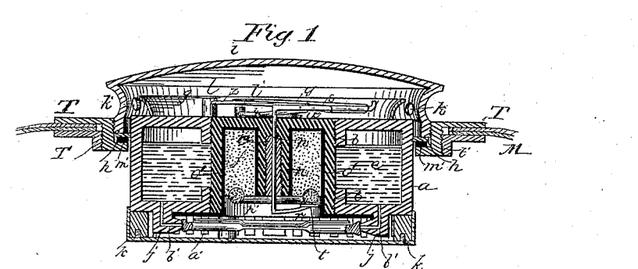
Figure 1 is a central section of the capsule.
Figure 2:
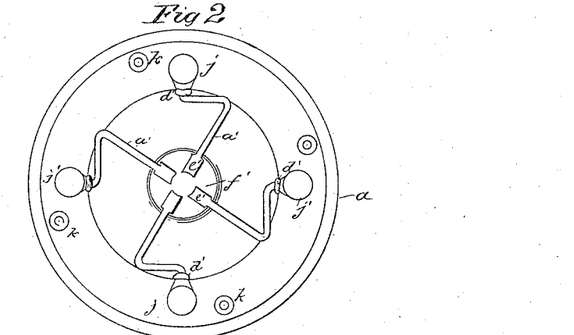
Fig. 2 is an inverted plan of the capsule with the bottom removed.
Figure 3:
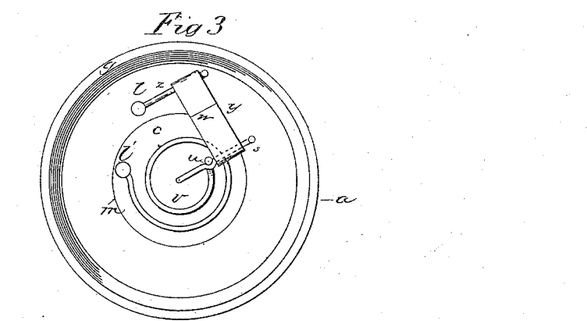
Fig. 3 is a plan of the capsule with the cap removed.

The space $ff$ is filled with a self-combustible compound, such as powder, ground very fine and compressed hard, so as to bring the period or duration of its combustion to a convenient point. Rosin or other material used in pyrotechnia may also be used to retard combustion. A coat, $o'$, of heat-obstructing or non-conducting material should be applied to the interior surface of the cylinder or wall of the space $f$ before being filled with powder, to prevent the communication of heat when the powder is burning to the space containing the liquefied gases. After the powder is compressed into the space $f$ by a special form of punch used for the purpose there remains in its surface a shallow groove, which is filled up with a suitable phosphoric paste or other material, which will ignite under friction, forming a ring over the powder and leaving a short space without paste where the arm $r$ of the rod $p$ ends, as shown in Fig. 1, so that the sand-paper attached to said arm cannot come in contact with the paste and ignite the same by friction while the apparatus is being handled.

Having now explained the construction of the capsule and its appurtenant parts, I will describe its operation and uses.

As already stated, when only drops or small quantities of water enter the holes $k'$ in the cap they are prevented from reaching the paper band by the curved brim $g$; hence the apparatus is secure from being operated when subjected to rain or accidental discharges of water on the cap; but if the cap be dipped in water, as when in actual use, the water passing quickly in considerable quantities through the holes flows over the brim and comes in contact with the paper band. The latter instantly becomes moistened, and, under the tension of the spring $v$, breaks. The spring now being allowed to exert its force on the arm $s$, pushes said arm around and rotates the rod $p$ and the lower arm $r$, thus causing the sand-paper to rub against the phosphoric paste and ignite the same. The powder is now ignited and immediately generates hot gases, which are thrown against the metallic disk $f'$ and protecting-cover $h'$, and find an exit around the slotted brim. As soon as sufficient heat is generated—that is, almost immediately upon the ignition of the powder—the springs $a'$ $a'$ fall loose, by reason of the melting of the solder, and the holes $b'$ in the projections $j$ $j$ are opened, whereupon the gas contained within the space $e$ issues, from its own tension, and, mingled with the gases from the burning powder, flows into the bag or gas-receptacle until the capsule is completely emptied.

The disk $f'$ serves a double purpose. Situated as it is between the two gas-compartments, it prevents a premature mixing of the gases and any explosion which might thereby ensue on account of the decomposition of the liquefied gas. The disk also takes up the heat from the burning powder, and radiating the same equalizes the temperature of the two gases before they meet, thus avoiding all danger which might follow the admixture of gases at different temperatures. This heat also prevents the freezing of the gas issuing under a release of pressure. Both gases issue freely, but slow enough to avoid concussion against the body of a person using a life preserver and displacing the water.

As before stated, no water can enter or gases escape from the apparatus while it is in place, except, perhaps, through the central hole containing the rod $p$; but to prevent any escape even through this channel I have provided a packing, as already explained, made of soft wood, which swells if any water finds its way into the hole, and thus tightly closes the passage. The hard tallow with which the hole is lined serves to keep the rod $p$ well lubricated and in good working condition. When the tallow is heated, as by the burning of the powder, it melts, and so fills the hole as to make the same perfectly gas-tight.

The purpose of having the spring $v$ push upward against the arm $s$ is to cause the sandpaper on the end of the arm $r$ to press against the phosphoric paste with sufficient friction to ignite the same while the rod $p$ is being turned.

The use of the combustible powder for the purposes stated is an important consideration. It is well known that liquefied gases when relieved of pressure absorb the heat they gave up during compression, and produce cold and freezing. If, then, the parts through which such gases are intended to issue have not heat enough to compensate for the cold, the channels will become clogged and stopped up by the ice, and the exit of the gas will be obstructed. Again, the volume of the gases under a reduced temperature is much less than it would be if the gases were heated or allowed to issue at an atmospheric temperature. The heat generated by the burning of the powder compensates for the cold produced by the expansion of the liquefied gases and brings both gases to an equal temperature. The quantity of powder to be used is proportioned by calculation to the quantity of gas under liquefaction. When one capsule is exhausted, another is substituted therefor, as is done in charging fire-arms with cartridges, and the used capsule may be recharged or filled.

As explained, the apparatus works automatically on coming in contact with water, and therefore may be applied to a variety of uses in saving life and property. A marine vessel may be supplied with a number of bags or gas-receptacles, each furnished with a charged capsule, and all stored or placed in a suitable part of the vessel, where upon the access of water they will inflate themselves and become floats to buoy up the vessel in the event of disaster. The apparatus may be used to great advantage on board men-of-war to avert the dangers following the piercing of the hull with shot or the production of leaks by torpedoes. Canvas rafts or boats may also be furnished with the apparatus, so arranged that gas compartments will become inflated as soon as the raft or boat is placed in the water. When not inflated, such boats or rafts may be rolled up, and on board a vessel will occupy but little space, while in case of necessity they will be found much safer and more servicable than the ordinary life boats or rafts. Bags or receptacles to contain mail-bags, trunks, and other devices may be constructed, and being furnished with the capsule and gas-receptacle constitute effective means for saving property that otherwise would be lost.

If, instead of being used to inflate a gas-holder, the gases are set free through a tube, so as to react against the water, a motor is produced which will serve to propel torpedoes, rafts, or other contrivances intended to be sent toward vessels not otherwise accessible.

In some instances the gas may be used both for propelling a raft, boat, or other device and at the same time to produce buoyancy by inflating bags or compartments with which the vessels is provided.

The principal use and application of my invention is in connection with life-preservers.

Figures 5, 6, 7, 8, 20, 21, 22:
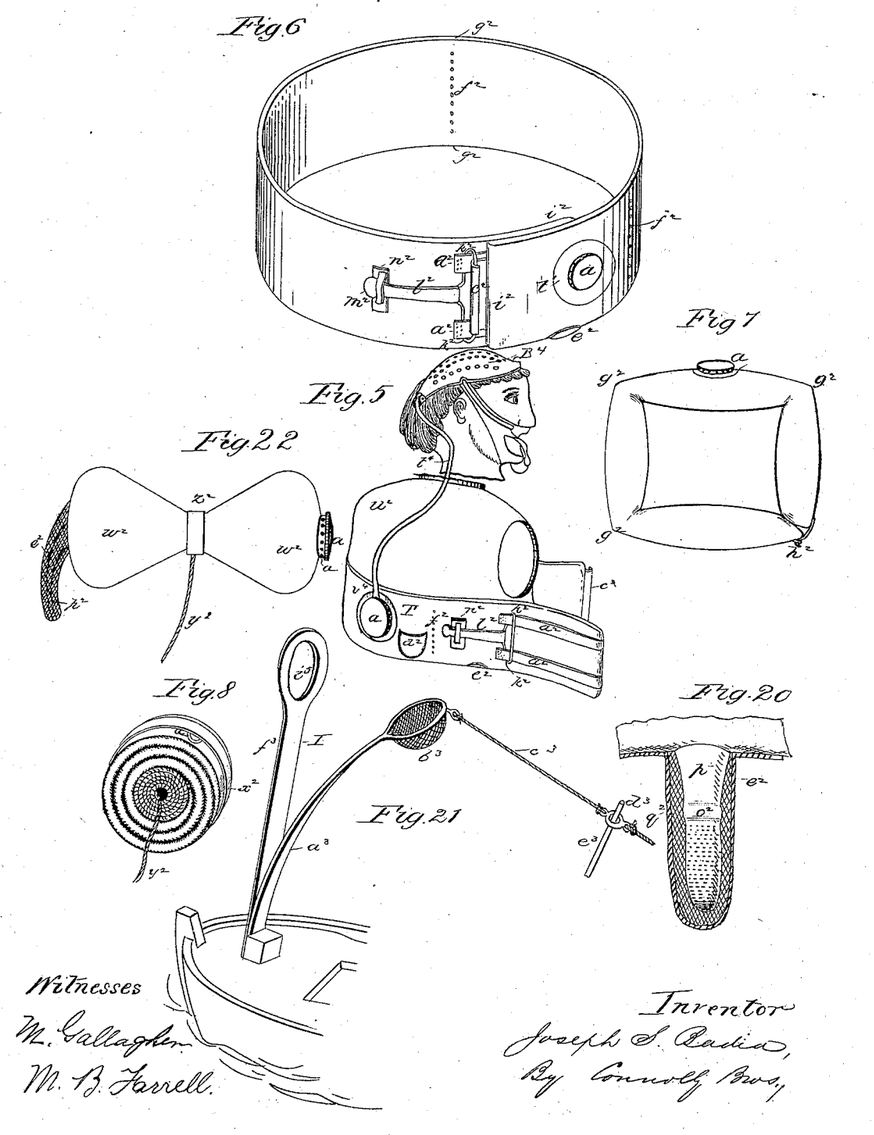
Fig. 5 shows in perspective the capsule combined with a life-preserver adapted for the use of swimmers and bathers.
Fig. 6 is a view of life-preserver with capsule adapted for use by ferry-boat passengers.
Fig. 7 is a plan of inflated life-preserver.
Fig. 8 is a perspective of life-preserver folded up to be thrown to a person in the water.
Figs. 17 to 20, inclusive, are miscellaneous detail views of devices pertaining to capsule and life-preserver.
Fig. 21 is a perspective of apparatus for throwing a life-preserver to a person or boat in the water.
Fig. 22 is a side view of modified form of life-preserver.
Figure 9:
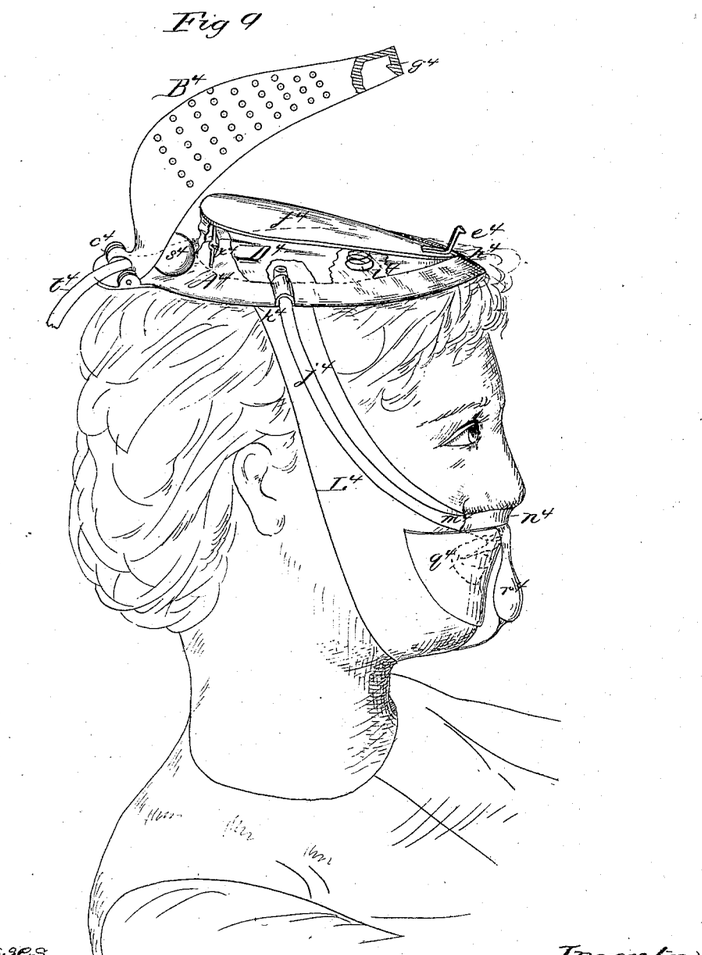
Figs. 9 to 16, inclusive, are detail views showing devices to be applied to head and face of swimmers and bathers for use in conjunction with life-preserver.

The life-preserver, as shown in Fig. 6, is made of suitable material in the shape of a long empty bag, to be worn around the breast, extending from the arm-pits to the waist. It is composed of two bags, one inside the other. The inner one is made gas and water proof. The outer bag is to strengthen the inner one and to protect it from wear and injury. The outer band is provided with the strips $a^2$, the ring $n^2$, the hook $c^2$, the valve-protector $e^2$, and the pocket $d^2$, all sewed in place. The flange $t'$ of the capsule holds the stuff of both bands or belts together, and in addition three seams, $f^2$, are made across and through both belts, thus dividing the preserver into four compartments, leaving above and below, as seen at $g^2$, a small space unseamed, so that the gases can pass through and all around. The seams are made for the purpose of giving the presever when inflated the shape shown in Fig. 7, which is nearly the form of a square ring. The seams being situated in the three corners, the fourth corner comes where the hook holds the ends together. The three corners are re-enforced inside to prevent rupture and consequent escape of gas at these points. If the preserver were not so constructed, folds would be produced all around, changing places with every movement of the wearer in the water, and rendering the preserver liable to break. The empty preserver is much longer than the breast circumference of the wearer, to allow for the decrease of length when the preserver becomes inflated. Thus the ends overlap each other, as shown at $i^2$ in Fig. 6, when the preserver is worn, and no inconvenience is caused by the extra length. The hook $c^2$ of one end engages the buckle $k^2$, which slips inside the strips $a^2$, which are stitched at both ends to the preserver, and is held back by the rubber strip $l^2$, the latter ending in a flat head, $m^2$, passing through the rubber ring, $n^2$, as shown. In wearing the preserver, the strip $l^2$, being a little elastic, keeps it always with a slight tension snugly around the breast of the wearer, preventing it from slipping down; but when the preserver begins to inflate, if in the water, the head $m^2$ slips out of the rubber ring $n^2$, which gets larger under the tension produced, and the strip $l^2$, now free but held by the buckle, moves back toward the end of the preserver, both ends meeting when the preserver is full of gas, as shown at $h^2$ in Fig. 7.

As the gases are produced in a very short time, and always a little in excess of the capacity of the preserver, I have provided the latter with a special valve, $e^2$, Fig. 20, which consists of a very elastic tube, $p^2$, re-enforced at $o^2$, to form a collar, as shown. The upper end of the tube is fastened to the inner band or preserver, while the lower end is closed, but is perforated with a number of small holes made by a common needle, and not apparent when the tube is in its normal condition. Outside the tube $p^2$ is a protecting-cover, $q^2$, closed at its lower end and fastened at its upper end to the outside preserver. This protecting-cover is made of fine but strong netting. When the preserver is worn, this protecting-cover is forced by hand into the preserver, as shown in Fig. 6; but when the preserver is inflated the valve projects under the pressure of the gas, assuming the shape and position shown in Fig. 20. As the valve expands with pressure the small needle holes or pricks now become effective to let the excess of gas escape as quickly as it is produced. When no more gas is produced, the ring $o^2$, being the stronger part of the tube, first contracts, and then the rest of the tube, the needle holes closing up and preventing the entrance of water. This automatic closing of the relief-holes under the contractile influence of the rubber, and its lack of affinity for water is an important consideration, especially in the use of ammoniacal gas, which, as is well known, rapidly dissolves in water.

The valve $e^2$ should be arranged on the under side of the preserver, so as to be always submerged when the preserver is in use.

Figures 16, 19:
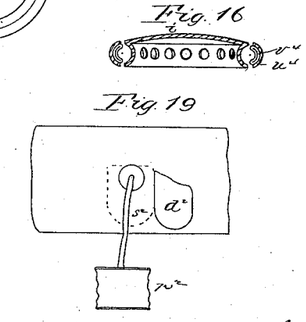

The pocket $d^2$ is designed to contain a small bellows, $r^2$, Fig. 19, communicating with the gas-receptacle by means of a small tube of thin rubber, $s^2$, to enable a person to fill up the gas-spaces should the gas escape during a long immersion in the water.

Fig. 22 shows a convenient form of life-preserver which may be thrown to a person in the water from a life boat or vessel when near approach is impracticable. Fig. 8 shows the form of such preserver when rolled up to be thrown. $X^2$ is a band of thick blotting-paper which binds the folds together, but which breaks upon contact with the water, allowing the folds to unroll and the preserver to become inflated. A suitable rope, $y^2$, is attached, whereby to draw the preserver and the person using it back to the boat. In using this form of preserver the rescued person lays his breast on the neck $z^2$ between the two conical bags $w^2$, and grasps the rope in his hands.

Fig. 21 shows an apparatus for casting a preserver toward a person in the water. $a^3$ is a spring, having a wire cap or basket, $b^3$, wherein the preserver, rolled up as shown, is to be placed. The rope $c^3$ is pulled back until the ring $d^3$ engages with a rod, $e^3$, whereby the spring $a^3$ is held bent or at a tension until the boat is in the right direction, when the ring is disengaged from the rod and the spring allowed to fly forward violently, projecting the contents of the wire cap many yards from the boat. I is a stop, against which the spring strikes in flying forward, and consists of a standard of wood having a hole, $i^5$, in its upper end, through which the preserver is thrown.

When not required for use, the standard I, with the spring $a^3$, may be displaced.

The life-preserver as so far explained is intended to become inflated as soon as it touches the water or within a few seconds after its immersion; but when the preserver is to be worn by a swimmer or bather the conditions change, for then the preserver will be under the water most of the time, and its use will only be required in case of actual danger of drowning. Consequently for swimmers and bathers it is expedient to provide means whereby the action of the preserver will be null except in the event of actual danger.

Figure 10:
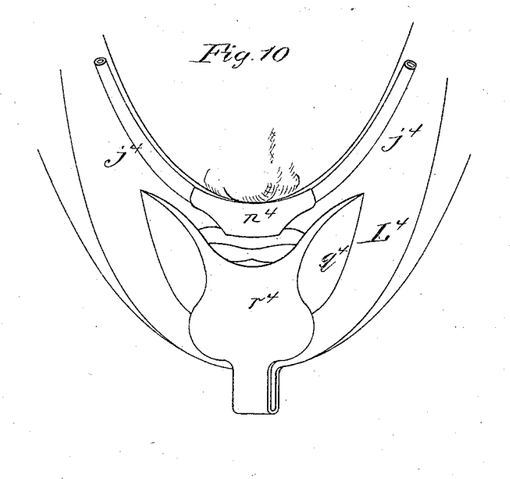
Figure 11:
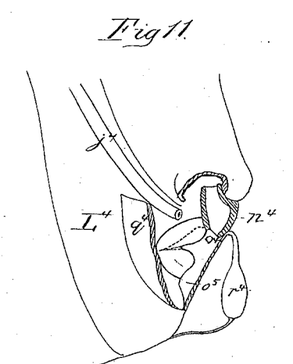
Figure 12:
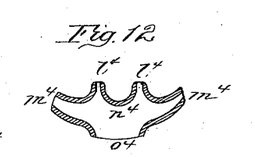
Figure 13:
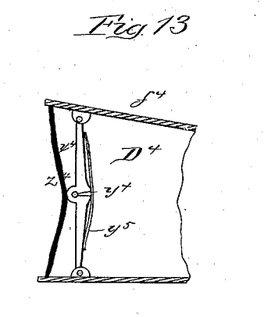
Figure 14:
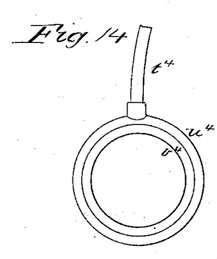

Figs. 9, 10, 11, 12, 13, 14, 15, and 16 show the means which I have devised for accomplishing this result. $A^4 B^4$ are two thin concave and approximately spoon-shaped plates hinged together at $c^4$. The upper plate, $B^4$, is pierced with holes, as shown, for the passage of water, and is so formed as to leave a space between it and the other plate, $A^4$, for a bellows-like chamber, $D^4$, (having a top plate, $f^4$, hinged at $p$, flexible sides, and an expanding spring,) when said plates $A^4$ and $B^4$ are fastened together, such fastening being accomplished by means of the catch $e^4$, secured to the plate $f^4$, engaging the cover $B^4$, when the chamber $D^4$ is expanded or inflated. When the top $f^4$ is drawn down, as it carries the catch $e^4$ with it, it leaves the top or plate $B^4$ free to rise. The spring $i^4$ has only strength enough to keep the top plate, $f^4$, raised, so that the smallest tendency to a vacuum produced inside the chamber $D^4$ will bring said plate $f^4$ down. A band, $L^4$, of very elastic and thin rubber, passes around the face of the wearer, being fastened on either side to the plate $A^4$. A piece, $n^4$, secured to this band, is situated under the nose, and connected to pipes $j^4$, which are fastened to the band $L^4$, and at $k^4$ pass under the plate $A^4$ and communicate with the interior of the chamber $D^4$. The nose-piece $n^4$ is hollow, as shown in Fig. 12, and has on its upper side two projections or nipples, $l^4$, which enter the nostrils of the wearer. In the lower part of the nose-piece there is a slit, $o^4$, through which the air is forced to pass in breathing with the nose, as there is no other passage available. The mask or band $L^4$ has an opening, $o^5$, Fig. 11, in front and under the piece $n^4$, as shown, so that the mouth remains free to speak or breathe. A thin rubber piece, $q^4$, over the opening $o^5$, as shown, in Figs. 10 and 11, is attached to the mask, pressing against the nose-piece and covering the mouth perfectly, so that no water can enter the mouth or nose if the wearer should attempt to breathe while under the water. In the front of the piece $q^4$ there is a weight, $r^4$, connected with it, and which, when the mouth is out of water, pulls the cover $q^4$ downward, as shown in Figs. 5 and 10, leaving the mouth uncovered, so that breathing and speaking can be performed without difficulty. The weight $r^4$ is made of such material that it has the same specific gravity as water; hence, when under the water the weight will be entirely null, either to float or sink, and therefore the cover $q^4$, having nothing to pull it down, returns up to the position before stated and shown in Figs. 9 and 11. The cover $q^4$ thus serves as an automatic valve, which opens when the mouth is out of the water and closes when the mouth is submerged. Inside the chamber $D^4$ there is a prop, $x^4$, Figs. 9 and 13, connected to the top and bottom of the same by hinges, the prop itself having another hinge, $y^4$, in the middle, to allow it to be folded, and having also a thin and stretched piece of rubber, $y^5$, pasted on the side opposite the hinge $y^4$, and operating as a spring to keep the prop straight. The object of this prop is to resist vibrations of the top $f^4$, which might disengage the catch $e^4$ and leave the cover $B^4$ free to rise. Furthermore, if a vacuum is produced inside the chamber $D^4$ its flexible sides are forced inward by the outside pressure and impinge against the prop, which is then forced to fold inward, allowing the top $f^4$ to descend. Between the hinge $c^4$, Fig. 9, and the two plates $A^4 B^4$ passes a rubber pipe, $t^4$, terminating in a close elastic ball, $s^4$, at the upper end, and with a closed ring, $v^4$, Figs. 5 and 14, at the lower end. The ball $s^4$ contains a spring, which tends to keep it in spherical form when the ball is not pressed down. The ring $v^4$ is protected outside by a metallic ring or curved band, $u^4$, to which it is glued and made fast, leaving only the inner side of the rubber ring to contract and expand. The pipe $t^4$ and ball $s^4$ are filled with air, but there being insufficient to fill the ring $v^4$, the latter, which is very thin and elastic, is caused to collapse against the outer ring, $u^4$, as shown in Fig. 16.

Figure 15:
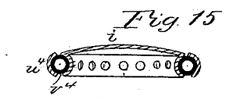

The construction of the different parts being explained, their operation is as follows: The ring $v^4$ is put around the cap of the capsule, applied to the preserver, as shown in Figs. 15 and 5. The cover-plate $B^4$ is now brought down to engage with the catch $e^4$, and in this way the ball $s^4$ is compressed and the air contained therein forced through the pipe $t^4$, causing it to fill the ring $v^4$, which, having no room to expand outward, presses inward against the cap $i$, closing all its holes and preventing the entrance of water and its access to the capsule. The preserver and capsule are now null under the water so long as the wearer retains presence of mind and consciousness, as in such case no attempt will be made to breath while the head is under water; but if, through fright or other cause, the bather attempt to breathe while the head is submerged, the first inspiration into the mouth or nostrils through the pipes $j^4$ and piece $n^4$ produces a slight tendency to vacuum in the chamber $D^4$, which is sufficient to bring down the top, carrying the catch $e^4$. The latter is thus disengaged from the cover $B^4$, which is then free to rise, and in its turn the ball, under the pressure of its spring, assumes its spherical form, thereby withdrawing the air from the ring, which contracts and allows plenty of water to enter through the holes in the cap and causes the capsule to operate.

As will be seen, the apparatus is entirely automatic, its action depending on the very acts which a person instinctively performs in case of danger. The attempt to breathe under adverse conditions and where breathing cannot be performed is the initial act which brings the life-saving instrumentalities into play.

The pipes $j^4$ should have inside a coil of fine wire to prevent their collapse, while permitting elongation to adapt the mask to different-shaped faces.

The pipe $t^4$ may be covered outside with a coil of fine wire to prevent expansion when the air is forced down from the ball to the ring and to protect the pipe from wear.

The head appliances may be attached to the hair-protecting caps usually worn by bathers.

Having now fully described the construction and operation of my invention, what I claim as new, and desire to secure by Letters Patent, is—

1. The combination, with a capsule containing materials for the production of gas and a gas bag or receptacle connected therewith and adapted to become buoyant when charged with gas, of a valve or valves normally closing the opening through which the gas escapes into the bag, valve-controlling mechanism, and a spring for operating the same when released, and a strip of paper or other material connected to the valve-controlling mechanism and to a stationary holder fastened to the capsule, said strip of paper being arranged to hold the valve-controlling mechanism in check and adapted to release the same and allow the valve to be automatically opened when said strip is ruptured by coming in contact with water, substantially as described.

2. A capsule for use substantially as hereinbefore described, the same comprising a casing subdivided into separate compartments for gas and powder, respectively, and provided with mechanism held in check by a strip of paper or its equivalent, which will break or become ruptured when moistened and release said mechanism, so that the gas will be generated and at the same time heat produced, as and for the purpose set forth.

3. The combination of a capsule containing gas-producing chemicals and valve-closing mechanism held in check by a strip of paper or its equivalent, which when moistened will liberate said mechanism and allow the gas to escape, with a life-preserving jacket having an inflatable compartment for the reception of gas issuing from the capsule, and a helmet for bathers or swimmers comprising an automatic valve for the protection of the mouth and nostrils, and a collapsible chamber connected by tubes with said valve and with the capsule, substantially as shown and described.

4. The combination, with a gas-bag, of a capsule adapted to contain liquefied or compressed gas and combustible powder and frictionally-ignitible paste or composition, said capsule consisting of a casing subdivided into separate compartments for the gas and powder, respectively, and provided with the following instrumentalities, viz: a curved brim or guard and a perforated cap inclosing the same, a series of nipples communicating with the gas-space, and a series of valves for closing said nipples and attached to a metallic disk by solder of a low point of fusion, a protecting-cover for said valves and disk, a rod or spindle packed with a cylinder of soft wood passing through a central boss in the powder-compartment, and armed with cranks one of which holds a frictional device for igniting the phosphoric paste, a spring bearing against the other crank to cause its rotation, and a strip of paper or other suitable material holding the rod in check and capable of being ruptured when moistened, all substantially as and for the purposes set forth.

In testimony that I claim the foregoing I have hereunto set my hand this 2d day of September, 1884.

JOSEPH S. BADIA.

Witnesses:
LISLE STOKES,
CHAS. B. SPROGESS.